(12) United States Patent
Zumbrunn et al.

(10) Patent No.: US 7,312,862 B2
(45) Date of Patent: Dec. 25, 2007

(54) MEASUREMENT SYSTEM FOR DETERMINING SIX DEGREES OF FREEDOM OF AN OBJECT

(75) Inventors: Roland Zumbrunn, Wittinsburg (CH); Albert Markendorf, Suhr (CH); Raimund Loser, Sisseln (CH); Jürgen Dold, Sempach (CH)

(73) Assignee: Leica Geosystems AG, Heerbrugg (CH)

( * ) Notice: Subject to any disclaimer, the term of this patent is extended or adjusted under 35 U.S.C. 154(b) by 59 days.

(21) Appl. No.: 11/389,757

(22) Filed: Mar. 27, 2006

(65) Prior Publication Data

US 2006/0222314 A1    Oct. 5, 2006

(30) Foreign Application Priority Data

Mar. 29, 2005    (CH) .................................. 00528/05

(51) Int. Cl.
*G01B 11/26* (2006.01)

(52) U.S. Cl. .............................. 356/139.03; 356/141.5; 702/153

(58) Field of Classification Search ........... 356/139.03, 356/141.1, 141.2, 141.5, 152.2, 152.3, 601, 356/612, 614, 622; 702/153, 167
See application file for complete search history.

(56) References Cited

U.S. PATENT DOCUMENTS 4,227,261 A * 10/1980 Robertsson ................. 398/169

| | | | |
|---|---|---|---|
| 5,440,392 A | 8/1995 | Pettersen et al. | |
| 5,973,788 A | 10/1999 | Pettersen et al. | |
| 6,115,111 A * | 9/2000 | Korah et al. ................. 356/4.01 |
| 6,362,875 B1 | 3/2002 | Burkley | |
| 6,420,694 B1 * | 7/2002 | Greenwood .................. 250/221 |
| 6,667,798 B1 | 12/2003 | Markendorf et al. | |
| 7,230,689 B2 * | 6/2007 | Lau ............................. 356/73 |
| 2004/0032596 A1 | 2/2004 | Lange et al. | |

FOREIGN PATENT DOCUMENTS

DE    3714776 A1    11/1988
GB    2341025 A    3/2000

* cited by examiner

Primary Examiner—Isam Alsomiri
(74) Attorney, Agent, or Firm—Rankin, Hill, Porter & Clark LLP

(57) ABSTRACT

A measurement system for determining six degrees of freedom ($\alpha$, $\beta$, d, $\phi$, $\chi$, $\psi$) of a reflector (2) or of an object (3) on which the reflector is arranged, comprises an angle- and distance measurement apparatus (1), e.g. a laser tracker, operating with a laser beam as a measurement beam (4). The reflector (2) is designed for a parallel reflection of the measurement beam (4) and has an apical opening or surface (6), in a manner such that a part of the measurement beam (4) directed onto the reflector (2), passes through the apical opening or surface (6), and is incident on a light-sensitive surface (7) arranged behind the reflector apex. Five degrees of freedom ($\alpha$, $\beta$, d, $\phi$, $\chi$) of the reflector (2) or the object (3) are computed from measurement data produced by the angle- and distance measurement apparatus (1) and by the light-sensitive surface (7).

10 Claims, 4 Drawing Sheets

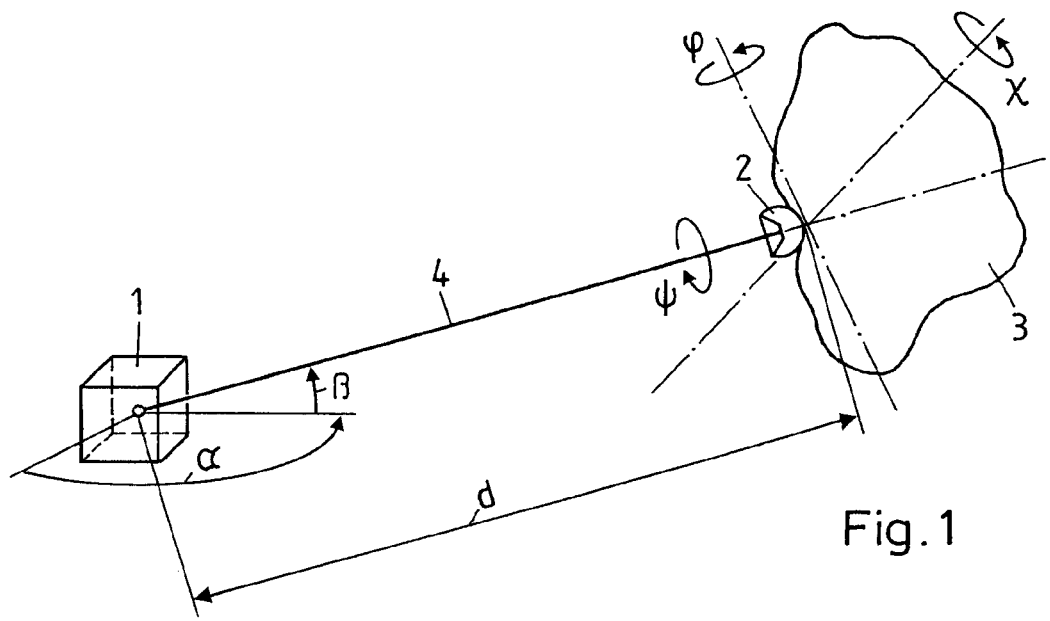
Fig. 1
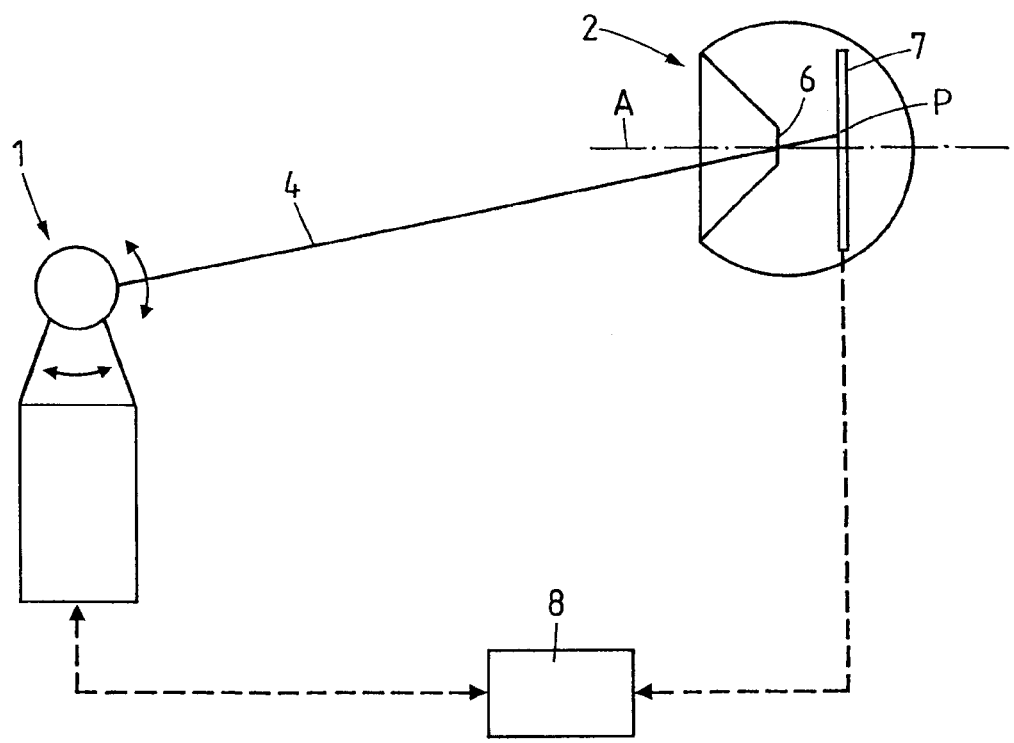
Fig. 2 (state of the art)

MEASUREMENT SYSTEM FOR DETERMINING SIX DEGREES OF FREEDOM OF AN OBJECT

BACKGROUND OF THE INVENTION

1. Field of the Invention

The invention lies in the field of metrology and relates to a measurement system for determining six degrees of freedom of an object, in particular of a moving object, more specifically it serves for determining three position coordinates of a reference point of the object and three rotation angles (tilt, yaw- and roll angle) about three orthogonal axes which run through the object and which intersect, for example, in the reference point.

2. Description of Related Art

For determining the six degrees of freedom of an object, for example laser trackers, theodolites or theodolite-like measurement apparatus provided with distance meters are used, wherein direction and distance (polar coordinates) to a plurality of points marked with reflectors in known positions on the object are determined. From the measured coordinates of the points, the six degrees of freedom of the object relative to a predefined coordinate system are calculated, for example, relative to the coordinate system of the measurement apparatus. Since the marked points are sighted and measured consecutively, the methods are in particular suitable for stationary objects or for objects which move slowly.

According to known photogrammetric methods, an arrangement of light points arranged on the object in known positions (e.g. white or reflecting marks, points illuminated by light beams or reflectors or active light sources) are imaged from different positions by a plurality of cameras. The directions to the light points relative to the optical axis of the respective camera are determined from the positions of the light points on the images recorded by the cameras, and the position and orientation of the light point arrangement and, as the case may be, also the position and orientation of the camera(s) in a predefined coordinate system are determined from the total quantity of the data. Since such photogrammetric evaluation of the six degrees of freedom is only suitable for moving objects if a plurality of simultaneously operating, advantageously stationarily arranged and calibrated cameras is provided, the method is relatively demanding, in particular regarding the data quantities which are to be handled.

For this reason it is suggested in the patent document U.S. Pat. No. 5,440,392 (Metronor) to use only one camera. If at least three light points are arranged on the object, and a calibrated camera is used, the data obtained from a single camera picture allows determination of the six degrees of freedom of the light point arrangement relative to the camera, wherein, however, no great accuracy can be achieved regarding depth, i.e. regarding the distance between the camera and the light point arrangement. The object on which the light points are arranged, is a touch tool, for example. The touch tool is positioned on a point to be measured and position and orientation of the point to be measured are determined from the position and orientation of the touch tool.

For improving the accuracy of the depth measurement, it is suggested, in a subsequent publication U.S. Pat. No. 5,973,788 (Metronor), to combine the single camera with a distance measurement apparatus, a so-called laser rangefinder, i.e. an apparatus operating with a laser beam as a measurement beam and a reflector for the reflection of the measurement beam back into the distance measurement apparatus, wherein the reflector is provided on the object in addition to the light points to be detected with the camera. The reflector, which may simultaneously also be one of the light points to be detected by the camera, has a known position in the light point arrangement.

A measurement system for determining five degrees of freedom of an object relative to a predefined coordinate system is known from the patent document U.S. Pat. No. 6,667,798 (Leica Geosystems). The system serves in particular for determining the five degrees of freedom of a moving reflector or of a moving object on which the reflector is arranged. The measurement system comprises a laser tracker equipped with a distance measurement apparatus. The laser tracker directs a laser beam (measurement beam) to the reflector and follows or tracks the reflector, when moving, wherein the direction of the measurement beam relative to the tracker is detected. The reflector is a retroreflector (triple mirror-reflector or cube-corner prism) whose apical tip is replaced by an apical opening (triple mirror reflector) or an apical surface which is aligned parallel to the entry surface (cube-corner prism), wherein the apical opening or surface is smaller than the cross section of the measurement beam. Whilst a part of the measurement beam is reflected back into the distance measurement apparatus and is analysed with respect to the distance between the tracker and the reflector, another part of the measurement beam passes the reflector, exits this through the apical opening or surface, and hits a light-sensitive surface arranged behind the reflector, for example a CCD (charge coupled device, as provided in a digital camera) or PSD (position sensitive device) which is preferably arranged perpendicular to the reflector axis and with its center point lying on the reflector axis. The image coordinates (x, y) of the location at which the measurement part beam hits this surface and which can be read out from the light-sensitive surface, is a direct measure for the angle of incidence of the measurement beam into the reflector (spatial angle between measurement beam and reflector axis) or for the rotation angle of the reflector axis about two axes aligned perpendicular to the measurement beam (tilt and yaw angle or two degrees of freedom of the orientation of the reflector or object). Five degrees of freedom of the reflector or of the object relative to a tracker-related coordinate system can be computed from the measurement data of the tracker (two spatial angles of the measurement beam relative to a predefined zero direction of the tracker and distance between tracker and reflector) and from the measurement data of the light-sensitive surface behind the reflector (tilt and jaw angle of the reflector axis relative to the measurement beam).

BRIEF SUMMARY OF THE INVENTION

It is the object of the invention to provide a measurement system for determining six degrees of freedom of an object, which measurement system is to be able to provide a measurement accuracy at least as good as the one achieved by the above described known measurement systems, and which measurement system is to be able to be realised with measurement apparatus which is per se known.

The measurement system according to the invention is based on the above-described measurement system, with which five degrees of freedom (three position coordinates, as well as tilt and yaw angle) of a reflector or of an object on which the reflector is arranged, can be determined. The measurement system according to the invention is extended with respect to the known system by way of an optically detectable addition element, which allows determination of the rotation of the reflector or the object about the reflector axis or about the measurement beam (roll angle).

The measurement system according to the invention, thus, comprises an angle and distance measurement apparatus based on a laser beam (measurement beam) and a reflector, wherein it is the reflector itself or an object on which the reflector is mounted, whose six degrees of freedom are to be determined. The reflector comprises the above-described apical opening or surface and the light-sensitive surface arranged behind the reflector apex. The measurement system further comprises a computer which is equipped for computing the six degrees of freedom of the reflector or object, from the measurement data.

The optically detectable addition element is stationary relative to the reflector at least during the measurement, and is detected from the angle or distance measurement apparatus, or it is stationary relative to the angle and distance measurement apparatus and is detected from the object. The optically detectable addition element is designed and arranged in a manner such that it defines a direction or a line in a plane which is not parallel to the reflector axis or the measurement beam, which direction or line can be deduced from the optical detection of the addition element. An angle between the mentioned direction or line, and a corresponding, predefined reference direction or reference line represents a measure for an absolute roll angle (sixth degree of freedom); an angle between two consecutively detected directions or lines represents a measure of the roll angle change.

The optically detectable addition element has no rotational symmetry with respect to any rotation axes encompassing as many possible measurement beam directions as possible, or a rotation symmetry with a symmetry angle of 180° only. This means that the direction or line defined by the addition element is not parallel to such rotation axes and the image of the addition element detected on an image plane comes into congruence with itself on rotation about 360° or as the case may be, about 180°.

The object whose six degrees of freedom are to be determined, according to the invention, is the reflector itself or an object on which the reflector is stationarily arranged at least during the measurement. The object, for example, is a hand-held touch tool or a movable, for example, likewise hand-held scanner (e.g. laser scanner), wherein the position of a touch point of the touch tool or of a scan point detected by the scanner is determined from the six degrees of freedom of the tool or scanner being determined in the above described manner. The object may also be an object to be guided in a controlled manner along a predefined path, such as, for example, a robot arm or a vehicle, wherein, for the control, the evaluated six degrees of freedom are compared to corresponding nominal values, and corresponding drives are activated on account of the deviations.

The measurement data used in the measurement system according to the invention and serving for computing the six degrees of freedom of the reflector or the object in a predefined co-ordinate system (e.g. a coordinate system related to the angle and distance measurement apparatus) are thus the following:

position and orientation of the angle and distance measurement apparatus in the predefined coordinate system;

position and orientation of the reflector and the light-sensitive surface arranged therebehind, in a coordinate system related to the object;

position and orientation of the addition element in the coordinate system related to the object or in a coordinate system related to the measurement apparatus;

as the case may be, the position and orientation of an additional detection means for the detection of the addition element in the coordinate system related to the object or in a coordinate system related to the measurement apparatus;

spatial direction of the measurement beam in the coordinate system related to the measurement apparatus, and distance between the measurement apparatus and the reflector, measured by the angle and distance measurement apparatus;

spatial angle between the measurement beam and the reflector axis (tilt and yaw angle) measured by the light-sensitive surface behind the reflector apex;

and the direction or line defined by the addition element and determined by the light-sensitive surface behind the reflector apex, or by the additional detection means.

Mathematical algorithms to be used for the computation of the six degrees of freedom from the mentioned data are known to the man skilled in the art.

BRIEF DESCRIPTION OF THE DRAWINGS

Exemplary embodiments of the measurement system according to the invention are described in detail in combination with the following Figs., wherein:

FIG. 1 is a schematic diagram illustrating the six degrees of freedom of the reflector or of the object on which the reflector is arranged, in the measurement system according to the invention;

FIG. 2 is a schematic diagram of the known measurement system for determining the five degrees of freedom (without roll angle) of the reflector or the object on which the reflector is arranged;

DETAILED DESCRIPTION OF THE INVENTION

Figure 3:
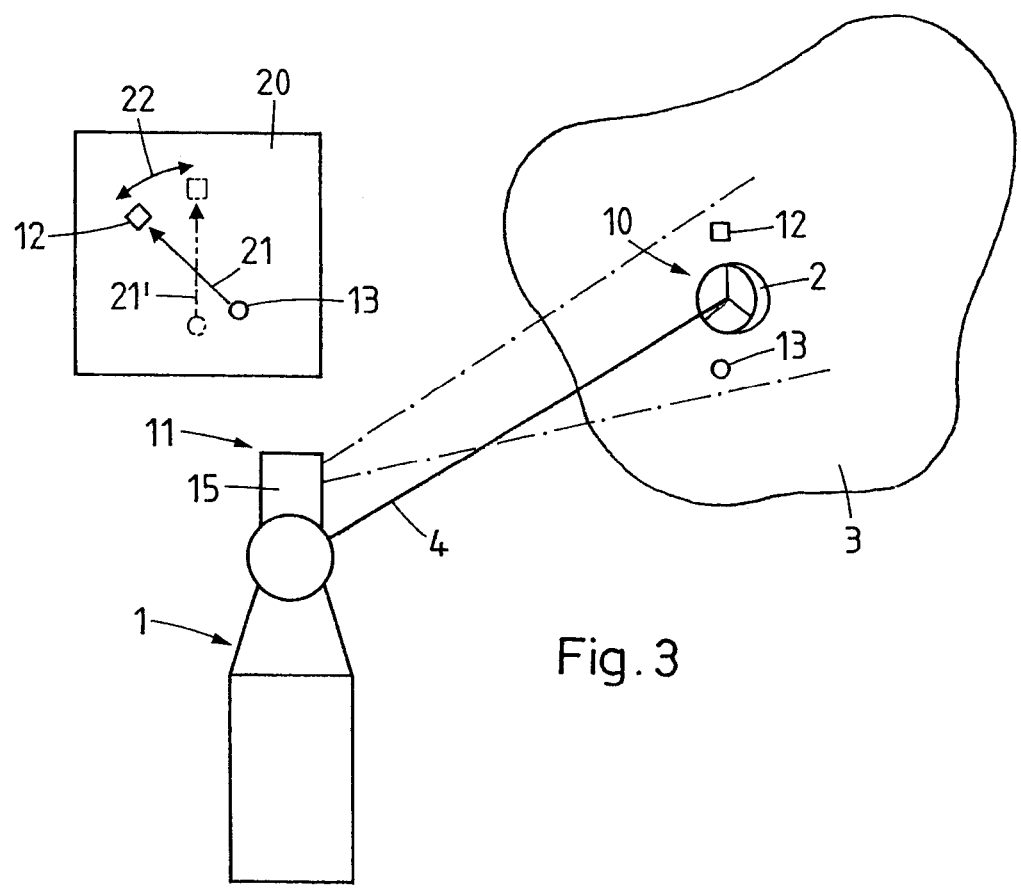
FIG. 3 shows an exemplary embodiment of the measurement system according to the invention in which the addition element is arranged on the object and is detected by an additional detection means arranged on the angle and distance measuring apparatus.

FIG. 1 shows the six degrees of freedom which are to be determined in the measurement system according to the invention. The angle and distance measurement apparatus 1, the reflector 2 arranged on the object 3 and the measurement beam 4 directed onto the reflector 2 by the angle and distance measurement apparatus 1 are shown schematically. The angle and distance measurement apparatus 1 measures the polar coordinates α, β and d of the reflector relative to a coordinate system (not shown) defined by the apparatus. The light-sensitive surface behind the reflector apex (not shown) measures the tilt angle φ and the yaw angle χ of the reflector relative to the measurement beam. The sixth degree of freedom is the roll angle ψ relative to the reflector axis or the measurement beam 4. All determined degrees of freedom can be transformed to further coordinate systems using known algorithms, if position and orientation of the coordinate system related to the angle and distance measurement apparatus 1 are known in the further coordinate system or can be determined.

FIG. 2 shows the measurement system on which the invention is based. This system serves for determining the five degrees of freedom α, β, d, φ and χ of the reflector 2 or of the object on which the reflector is arranged. Belonging to this measurement system are the angle and distance measurement apparatus 1 and the reflector 2. The measurement apparatus operates with a laser beam (measurement beam 4) and is, for example, a laser tracker or theodolite provided with a distance meter. The reflector 2 is designed for reflecting the incident measurement beam 4 in parallel, independently of the direction in which the measurement beam 4 is incident onto the reflector 2. The angle and distance measurement apparatus 1 is designed for determining the spatial direction of the measurement beam, and to analyse the reflected measurement beam, and from this, to deduce a path length of the measurement beam or a path length difference (absolute or relative distance measurement). The reflector 2 is a triple mirror or a cube-corner prism, wherein the apex of the reflector is not pointed, but comprises an opening (triple mirror) or an exit surface 6 aligned parallel to the entry surface (cube-corner prism), wherein the opening or surface 6 is smaller than the cross section of the measurement beam 4. Due to this non-pointed reflector apex, a part of the measurement beam 4 penetrates the reflector 2 in an unreflected manner and is incident onto the light-sensitive surface 7 which is arranged behind the reflector apex and which for example is a CCD or PSD. This surface 7 produces a measurement signal which corresponds to the position P (two image coordinates) of the incident part of the measurement beam, and represents a direct measure for the tilt and yaw angle of the reflector axis A relative to the measurement beam 4.

The computer 8 computes the five degrees of freedom of the reflector 2 or of the object 3 on which the reflector is arranged, from the measurement data of the angle and distance measurement apparatus 1 and from the light-sensitive surface 7.

The reflector axis A is advantageously aligned perpendicularly to the light-sensitive surface 7 and penetrates through the center thereof. The reflector axis A advantageously represents the z-axis of the coordinate system related to the object, and the optical center of the reflector represents the coordinate origin.

FIG. 3 shows an exemplary embodiment of the measurement system according to the invention, in which the optically detectable addition element 10 is arranged on the object 3 and is detected by an additional detection means 11 arranged on the angle and distance measurement apparatus 1. The addition element 10, for example, consists of two light points 12 and 13. The additional detection means 11 is designed for imaging the addition element 10 in an image plane. The additional detection means 11 is, for example, a camera 15 with a CCD, which at least during measurement is stationary relative to the measurement beam. The two light points 12 and 13 are passive markings, reflectors, active light sources or points produced by light beams directed against the object. They are advantageously arranged in a plane which runs roughly transversely to the reflector axis, which advantageously crosses a line connecting the two light points roughly in the middle. If, of the two light points 12 and 13, each one can be identified in an image 20 taken by the camera or if the light points are synchronised with the camera in a manner such that they appear one after the other on consecutively recorded images, a line connecting the two points can be determined from the images, the line having an unambiguous direction 21. An angle 22 between the directed connection line 21 and a corresponding, likewise directed reference line 21' is a measure of the roll angle of the reflector 2 or of the object 3, wherein this angle 22 is to be transformed from a coordinate system related to the camera to the coordinate system of the angle and distance measurement apparatus, or to a further, pre-defined coordinate system, if the camera axis is not aligned with the measurement beam 4.

A single angle 22 results if a direction is deduced from the camera images 20 of the addition element 10 (light points are identified). If only a line can be deduced from the image (light points are not identified), two angles 22 differing by a reflector rotation of 180° are deduced. In the latter case, an unambiguous evaluation of the roll angle may still be possible, if a limitation of the measurement range rules out one of the resulting angles, or if in a relative measurement one of the resulting angles is not realistic.

The reflector 2 may of course also function as one of the light points 12 or 13 if the camera 15 is aligned coaxially to the measuring beam, or if the reflector 2 is illuminated from the camera 15, for example by way of a flash light.

Figure 4:
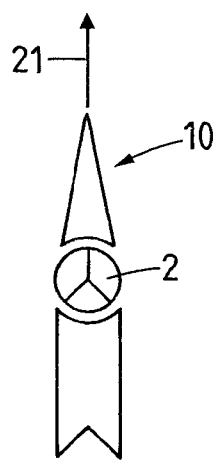
FIGS. 4 and 5 show further exemplary embodiments of the addition element for the measurement system according to FIG. 3.
Figure 5:
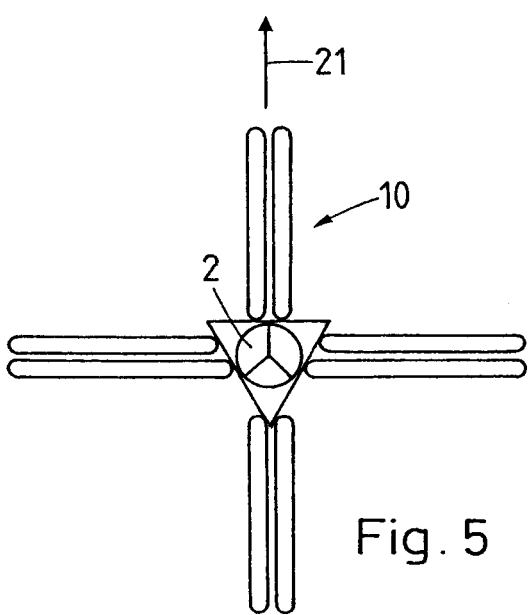

It is not a condition for the measurement system, according to FIG. 3, that the addition element 10 consists of two light points 12 and 13 or of one light point 12 or 13 and the reflector 2. Suitably shaped arrangements of more than two light points or imagable, two-dimensional elements are also conceivable as addition elements 10. FIGS. 4 and 5 show two exemplary addition elements 10.

FIG. 4 shows an addition element 10 in the form of a two-dimensional arrow, from whose image a direction 22 can be deduced. FIG. 5 shows an addition element 10 which consists of a triangle and a cross, wherein one corner of the triangle is aligned with one arm of the cross, such distinguishing this arm with regard to direction. The triangle corners are marked, for example, by way of active light points, the cross-arms are painted or stuck onto the object. The cross-arms are, for example, designed as black double lines on a white background. This has the advantage that, for determining the direction 21 from the image of the addition element, the intermediate space between the black lines may be analysed for a measurement from a short distance, and the black double line as a whole for a measurement from a greater distance. Thus, with a detection by way of a zoom-less camera, it is possible to achieve an equivalent accuracy from greatly different distances between camera 15 and addition element 10.

If it is sufficient to deduce a line from the image of the addition element 10, it is evidently sufficient to attach on the object 3 a single line which is detectable by the camera 15 and which is, for example, designed in the same manner as the cross arms of the addition element according to FIG. 5.

Figure 6:
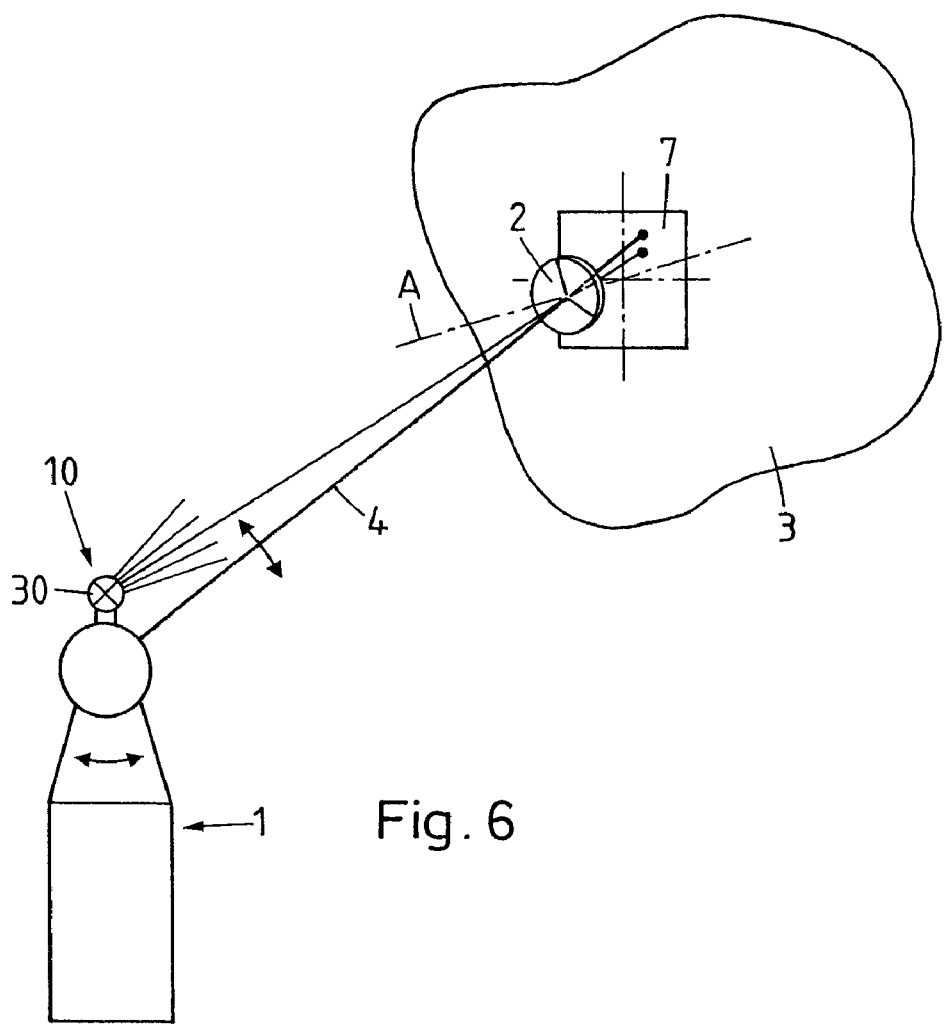
FIG. 6 shows an exemplary embodiment of the measurement system according to the invention, in which the addition element is arranged on the angle and distance measurement apparatus and is detected by the light-sensitive surface behind the reflector.

FIG. 6 shows a further exemplary embodiment of the measurement system according to the invention, which system again comprises an angle and distance measurement apparatus 1 and a reflector 2 with a light-sensitive surface 7 arranged behind the reflector apex, the reflector being arranged on an object 3. The addition element 10 in this embodiment is a light source 30 which is arranged on the angle and distance measurement apparatus 1 and which is detected as a light point by the light-sensitive surface 7. At least during measurement, light from the light source 30 passes through the apex opening or surface of the reflector and is incident on the light-sensitive surface to be detected there as an image point, which is possible without interference with the detection of the measurement beam 4.

The light source 30 is, for example, arranged on the angle and distance measurement apparatus having a fix position and orientation or advantageously rotating together with the measurement beam about the vertical apparatus axis. As indicated in FIG. 6, light source 30 emits diffuse light roughly in the direction of the reflector. The light source 30 may also be a laser which is directed to the reflector with the aid of measurement data provided by the angle and distance measurement apparatus. A laser which emits a laser beam lying in the same vertical plane as the measurement beam is also conceivable, wherein this laser beam is widened in this plane by way of suitable optics (e.g. a cylinder lens), or wherein the laser or a fibre-optic end leading the laser beam executes a scanning movement in this plane. In the latter case, a sensor detecting the laser beam of the light source 30 reflected by the reflector is to be provided, wherein the sensor signal is used for synchronizing detection of the laser beam by the light-sensitive surface 7 with the incidence of this laser beam on this surface.

Thus, not only the measurement beam 4 but also a light beam departing from the light source 30 is detected on the light-sensitive surface 7, wherein the imaged light points on the surface 7 may either be distinguished from one another (different intensities or wavelengths) or may be detected consecutively. The light-sensitive surface is to be designed accordingly. For simultaneous detection it is, for example, a CCD. For consecutive detection, a PSD may also be used.

Figure 7:
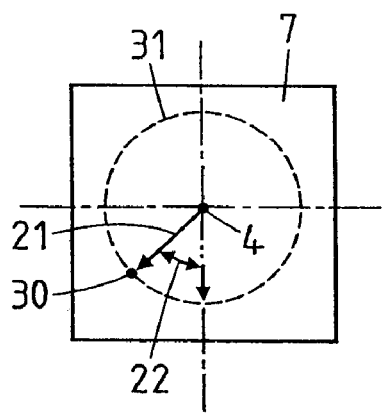
FIGS. 7 and 8 show two exemplary images of the addition element of the measurement system according to FIG. 6.
Figure 8:
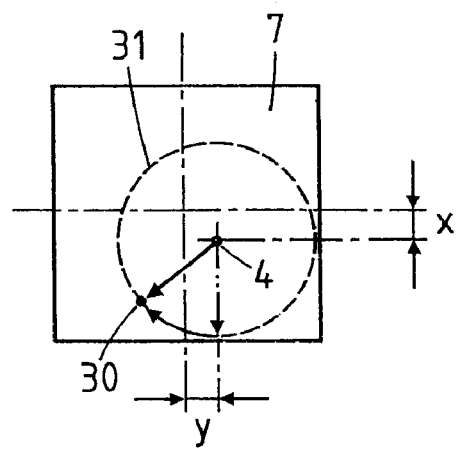

FIGS. 7 and 8 show two examples of images of the measurement beam 4 and of the light source 30 on the light-sensitive surface 7, as well as the direction 21 and the angle 22, which can be deduced therefrom. A circle 31 is further represented, on which the image point representing the light source 30 travels with a varying roll angle. FIG. 7 represents a case in which the measurement beam 4 falls perpendicularly onto the face of the reflector 2 and in which the corresponding image point therefore lies in the center of the light-sensitive surface 7. FIG. 8 shows a case in which the measurement beam 4 falls on the reflector at an angle and in which therefore the corresponding image point lies eccentrically on the light sensitive surface. Two degrees of freedom of the reflector are computed from the named eccentricity, and the third degree of freedom from the direction 21.

Figure 9:
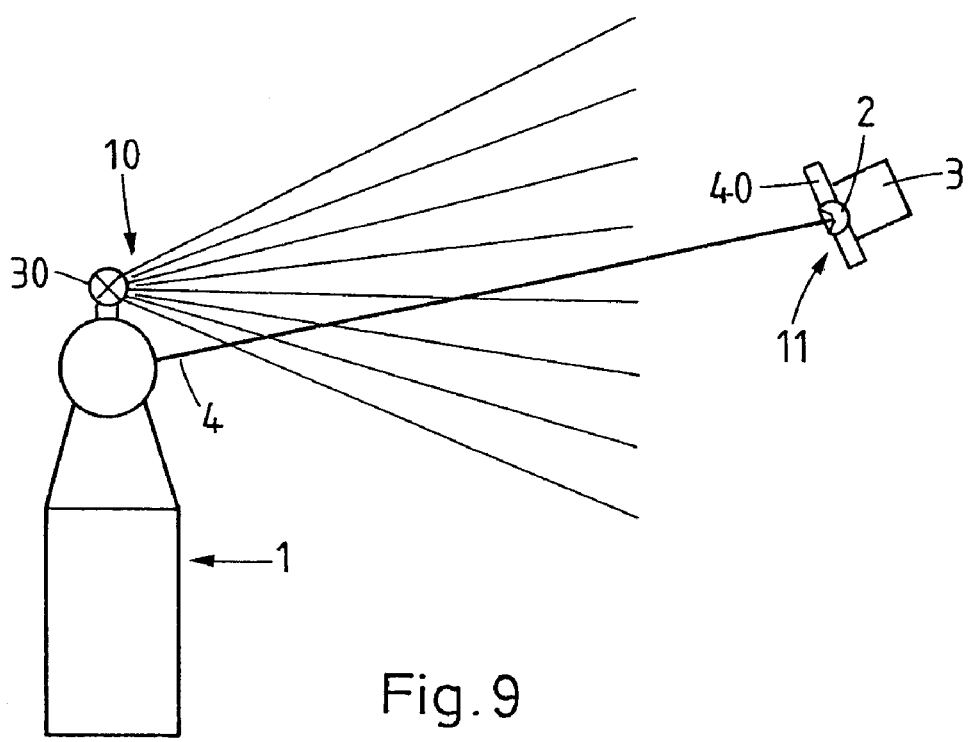
FIG. 9 shows an exemplary embodiment of the measurement system according to the invention, in which the addition element is arranged on the angle and distance measurement apparatus and is detected by an additional detection means arranged on the object.
Figure 10:
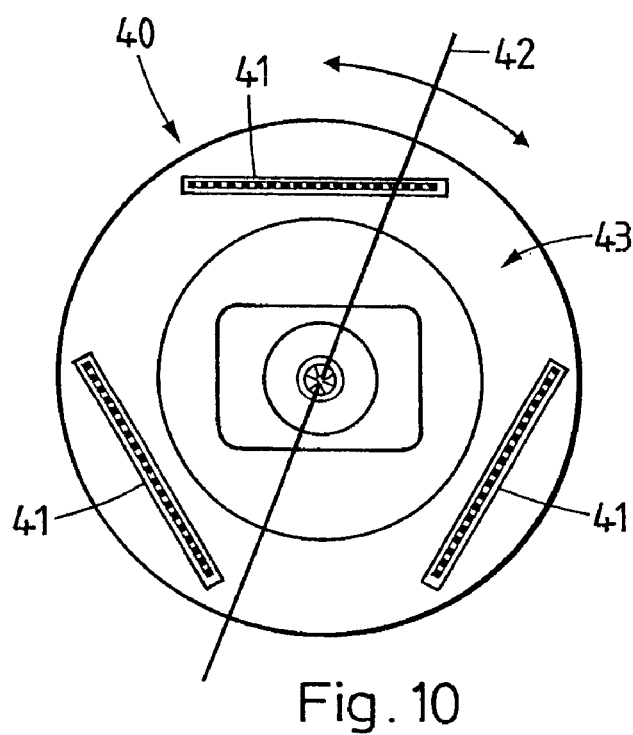
FIG. 10 shows the additional detection means of the measurement system according to FIG. 9.

FIGS. 9 and 10 show a further exemplary embodiment of the measurement system according to the invention, in which the optically detectable addition element 10 is arranged on the angle and distance measurement apparatus 1 and, on the object 3, an additional detection means 11 is provided for its detection.

The addition element 10 is again a light source 30. It is arranged on the angle and distance measurement apparatus 1 and emits light in the vertical plane of the measurement beam 4. The light source 30 is, for example, a laser and an optical element (e.g. cylinder lens) spreading the laser beam in the mentioned plane, or it is a laser which emits a laser beam executing a scanning movement in the mentioned plane. The additional detection means 11, which is shown in FIG. 10 (front elevation), is a ring sensor 40 arranged, for example, concentrically around the reflector. This ring sensor 40 comprises an annular row of light-sensitive elements 41, wherein these elements 41 are arranged in the row in a manner such that the essentially vertical light line 42 thrown onto the sensor by the light source 30 is incident on one or two light-sensitive elements and is detected by these.

The annular row of light-sensitive elements 41 of the ring sensor 40 according to FIG. 10 comprises gaps 43 lying opposite light-sensitive elements 41, so that the light line 42 which is thrown from the light source 30 onto the ring sensor is detected by only one element 41. From such detection a line, not a direction, can be deduced. For detecting a direction, the ring of light sensitive elements is to be without gaps such that the light line 42 is detected at two locations, and the light source 30 is to be designed for a scanning light beam movement. The direction can in the latter case be deduced from two consecutive detections.

It is, of course, also possible to arrange the light source 30 on the object 3, and the ring sensor 30 on the angle and distance measurement apparatus 1 instead of the camera represented in FIG. 3.

The invention claimed is:

1. A measurement system for determining six degrees of freedom ($\alpha$, $\beta$, d, $\phi$, $\chi$, $\psi$) of a reflector (2) or of an object (3) on which the reflector (2) is arranged, said measurement system comprising:
    an angle and distance measurement apparatus (1) emitting a laser beam as a measurement beam (4), the reflector (2) being designed for a parallel reflection of the measurement beam (4) and comprising an apical opening or surface (6);
    a light-sensitive surface (7) arranged behind the reflector apex in a manner such that a part of the measurement beam (4) directed onto the reflector (2) passes through the apical opening or surface (6) of the reflector (2) and is incident on the surface (6), which is light sensitive;
    an optically detectable addition element (10) which is stationary relative to the reflector (2) and is detected from the angle and distance measurement apparatus (1), or is stationary relative to the angle and distance measurement apparatus (1) and is detected from the object (3), the optically detectable addition element (10) defining a direction (21) or a line which does not lie on a reflector axis (A) nor on the measurement beam (4); and
    a computer (8) being equipped for computing five degrees of freedom ($\alpha$, $\beta$, d, $\phi$, $\chi$) of the reflector (2) or the object (3), from the measurement data produced by the angle and distance measurement apparatus (1) and by the light-sensitive surface (7) and for computing the sixth degree of freedom ($\psi$) of the reflector (2) or the object (3) from measurement data obtained by the detection of the addition element (10).

2. A measurement system according to claim 1, wherein the optically detectable addition element (10) is arranged on the object (3), wherein a camera (15) for detecting the addition element is arranged on the angle and distance measurement apparatus (1), and wherein the computer (8) is equipped for computing the sixth degree of freedom from images (20) of the addition element (10) recorded by the camera (15).

3. A measurement system according to claim 2, wherein the addition element (10) comprises two light points (12, 13) or is a light point arrangement which can be reduced to a direction (21) or to a line, or has a two-dimensional shape which can be reduced to a direction (21) or a line.

4. A measurement system according to claim 3, wherein one of the two light points (13, 14) is the reflector (2).

5. A measurement system according to claim 1, wherein the optically detectable addition element (10) is arranged on the angle and distance measurement apparatus (1), wherein the addition element is detectable by the light-sensitive surface (7) arranged behind the reflector apex, and wherein the computer (8) is equipped for computing the sixth degree of freedom ($\psi$) from coordinates of image points produced by the addition element (10) and the measurement beam (4), said coordinates being determined by the light-sensitive surface.

6. A measurement system according to claim 5, wherein the optically detectable addition element is a light source (30) which beams in a vertical plane in which the measurement beam (4) lies.

7. A measurement system according to claim 1, wherein the optically detectable addition element (10) is arranged on the angle and distance measurement apparatus (1), wherein an additional detection means (11) is provided on the object (3) for the detection of the addition element (10), and wherein the computer (8) is equipped for computing the sixth degree of freedom ($\psi$) from measurement data of the additional detection means (11).

8. A measurement system according to claim 7, wherein the addition element (10) is a light source (30) throwing a light line (42) onto the object, and wherein the additional detection means (11) is a ring sensor (40) with an annular row of light-sensitive elements (41).

9. A measurement system according to claim 1, wherein the angle and distance measurement apparatus (1) is a laser tracker.

10. A measurement system according to claim 1, wherein the object (3) is a touch tool or a movable laser scanner and that the computer (8) is equipped for computing the position of a touch point of the touch tool or of a scan point of the laser scanner from the computed six degrees of freedom ($\alpha$, $\beta$, d, $\phi$, $\chi$, $\psi$) of the touch tool or laser scanner.

* * * * *